US008972855B2

(12) United States Patent
Liu et al.

(10) Patent No.: US 8,972,855 B2
(45) Date of Patent: Mar. 3, 2015

(54) METHOD AND APPARATUS FOR PROVIDING CASE RESTORATION

(75) Inventors: Zhu Liu, Marlboro, NJ (US); David Gibbon, Lincroft, NJ (US); Behzad Shahraray, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1366 days.

(21) Appl. No.: 12/336,005

(22) Filed: Dec. 16, 2008

(65) Prior Publication Data
US 2010/0153093 A1   Jun. 17, 2010

(51) Int. Cl.
G06F 17/00 (2006.01)
G06F 17/27 (2006.01)
G06F 17/21 (2006.01)
G06F 17/28 (2006.01)
G10L 15/197 (2013.01)
G10L 15/26 (2006.01)

(52) U.S. Cl.
CPC ............ *G06F 17/273* (2013.01); *G06F 17/211* (2013.01); *G06F 17/28* (2013.01); *G10L 15/197* (2013.01); *G10L 15/26* (2013.01)
USPC ........... 715/257; 715/256; 715/249; 715/234; 704/9; 704/10; 704/246; 704/251; 704/255

(58) Field of Classification Search
CPC ... G10L 15/063; G10L 15/183; G10L 15/197; G10L 15/22; G10L 15/18; G10L 15/088; G10L 15/26; G06F 17/2818; G06F 17/2845; G06F 17/273; G06F 17/211; G06F 17/28

USPC ......... 715/200, 205–209, 230–234, 255–272, 715/700, 827, 249; 704/231–257, E15.04, 704/E15.008, E15.018, 9–10, E15.023, 704/E15.043
See application file for complete search history.

(56) References Cited

U.S. PATENT DOCUMENTS

| 7,860,717 B2* | 12/2010 | Urhbach et al. | ............... 704/276 |
| 2002/0099744 A1* | 7/2002 | Coden et al. | .................... 707/531 |
| 2005/0228642 A1* | 10/2005 | Mau et al. | ........................ 704/9 |
| 2007/0106977 A1* | 5/2007 | Arguelles | ..................... 717/115 |

OTHER PUBLICATIONS

Stolcke, A.,"Entropy-based Pruning of Backoff Language Models," Jun. 11, 2000, 5 pages.*
Batista, F. et al.,"Temporal Issues and Recognition Errors on the Capitalization of Speech Transcriptions," © 2008, TSD 2008, LNAI 5246, Springer-Verlag Berlin Heidelberg, pp. 45-52.*
Buchholz et al.,"Integrating seed names and ngrams for a named entity list and classifier," © 2000, in Proc. of LREC-2000, 7 pages.*
Lita, L.V. et al.,"tRuEcasIng," © Jul. 2003, in Proc. 41st Annual Mtg. of the Assoc. for Comp. Linguistics, pp. 152-159.*
Chelba et al.,"Adaptation of Maximum Entropy Capitalizer: Little Data Can Help a Lot," © Jul. 13, 2005, Elsevier, pp. 382-399.*

(Continued)

*Primary Examiner* — Cesar Paula
*Assistant Examiner* — James H Blackwell

(57) ABSTRACT

A method and apparatus for providing case restoration in a communication network are disclosed. For example, the method obtains one or more content sources from one or more information feeds, and extracts textual information from the one or more content sources obtained from the one or more information feeds. The method then creates or updates a capitalization model based on the textual information.

19 Claims, 4 Drawing Sheets

(56) References Cited

OTHER PUBLICATIONS

Bikel et al., "Nymble: a High-Performance Learning Name-finder," © Mar. 27, 1998, 8 pages.*

Kim et al., "Automatic capitalization generation for speech input," © Jun. 19, 2003 Elsevier Ltd., pp. 67-90.*

Fairon, C., "Corporator: A Tool for creating RSS-based specialized corpora," in 11$^{th}$ Conf. of the European Chapter of the Assoc. for Computational Linguistics, Proc. of the 2$^{nd}$ Intl. Workshop on Web as Corpus, © Apr. 2006, pp. 43-49.*

Nisimura, R. et al., "Automatic N-gram Language Model Creation from Web Resources," © 2001, In Proceedings of Eurospeech, pp. 2127-2130.*

Niu et al., "Orthographic Case Restoration Using Supervised Learning Without Manual Annotation," © 2003, AAAI, pp. 402-406.*

Martins et al., "Dynamic Language Modeling for a Daily Broadcast News Transcription System," © Apr. 2007, IEEE, pp. 165-170.*

D.C. Gibbon and Z. Liu, "Chapter 8.5. Capitalization," in Introduction to Video Search Engines, © Sep. 26, 2008 (283 pages total), Springer, specifically, pp. 189-194.*

* cited by examiner

METHOD AND APPARATUS FOR PROVIDING CASE RESTORATION

The present invention relates generally to communication networks and, more particularly, to a method and apparatus for providing case restoration for a communication network such as a network that provides voice, data, and/or multimedia services.

BACKGROUND OF THE INVENTION

Today's communication networks enable users to communicate using a variety of media. For example, users of networks may view broadcast signals over televisions, computers, etc. Communications service providers often deliver content in multiple ways to allow users to receive the content in a manner convenient for them. For example, broadcast channels may include closed captioned text to allow viewers to read the transcript instead of listening to the broadcasts. Closed captioned text offers an alternative for accessing information in places where listening to a specific conversation may be difficult or impossible. For example, a user may be in a library, at an airport terminal, in a media room with too many televisions tuned to different channels, and so on. Furthermore, a user with hearing difficulties may use closed captioned text. However, the closed captioned text is provided in all capital letters regardless of the appropriate case that should be applied, thereby producing a transcript that is of poor quality.

SUMMARY OF THE INVENTION

In one embodiment, the present invention discloses a method and apparatus for providing case restoration in a communication network. For example, the method obtains one or more content sources from one or more information feeds, and extracts textual information from the one or more content sources obtained from the one or more information feeds. The method then creates or updates a capitalization model based on the textual information.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing case restoration in a network, e.g., a packet network, a wireless network, an Internet Protocol (IP) network, a switched network, etc. Although the present invention is discussed below in the context of IP networks, the present invention is not so limited. Namely, the present invention can be applied for any communications network wherein text is used to present content to a user and/or a computer.

Figure 1:
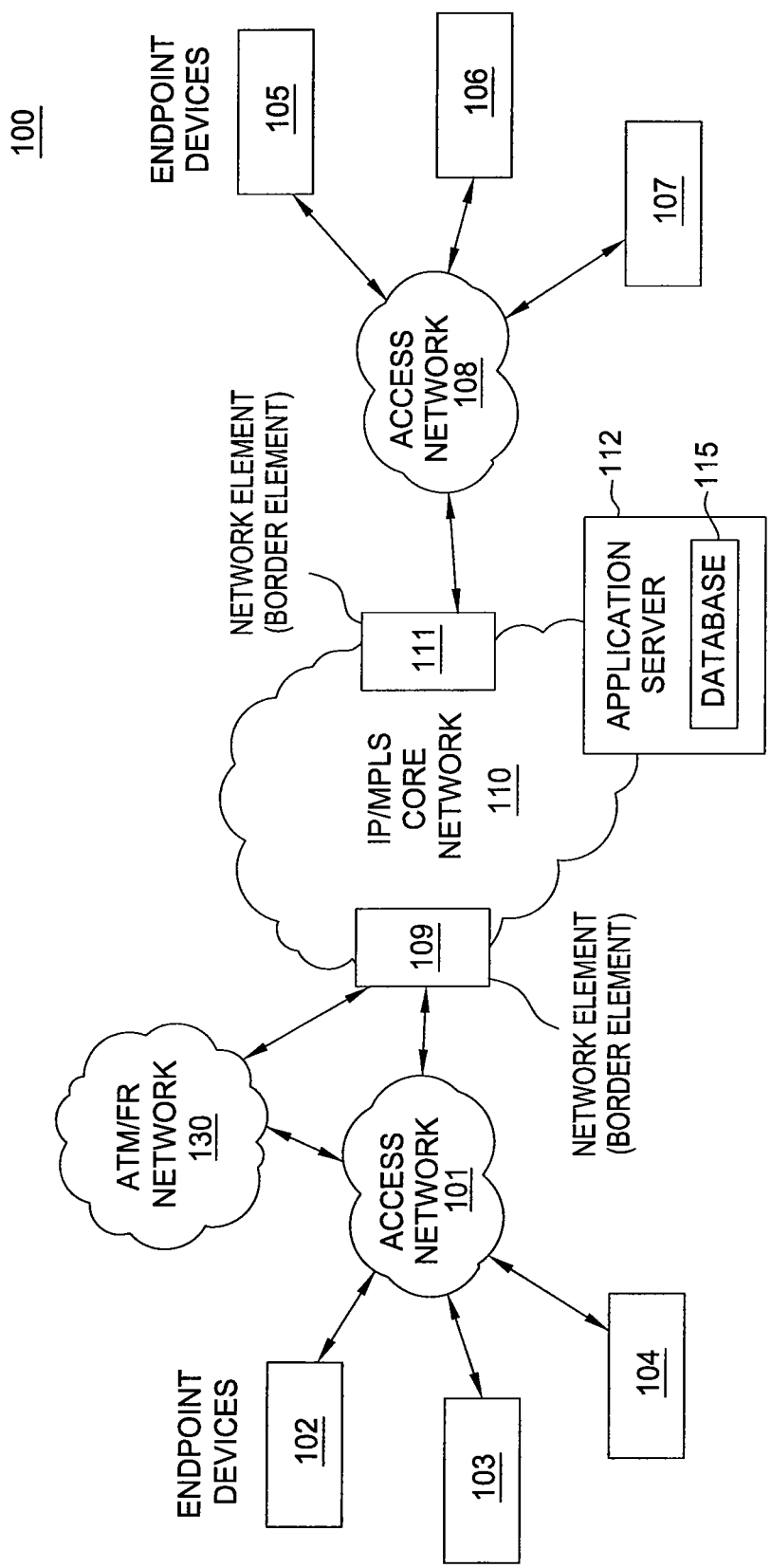
FIG. 1 is a block diagram depicting an illustrative network related to one embodiment of the present invention.

FIG. 1 is a block diagram depicting an exemplary network 100 related to the current invention. Exemplary networks include packet networks, switched networks, Internet protocol (IP) networks, Asynchronous Transfer Mode (ATM) networks, frame-relay networks, wireless networks, and the like.

A switched network is broadly defined as a network that creates continuous pathways between callers and called parties by disconnecting and reconnecting lines in various configurations (i.e. by switching). ATM, frame-relay and IP networks, etc. are packet based networks. An IP network is broadly defined as a network that uses Internet Protocol such as IPv4 or IPv6 and the like to exchange data packets. Wireless networks are networks used to enable users to communicate using wireless devices, e.g., Global System for Mobile (GSM) networks, wide area cellular telephone networks like 2G and 3G (second and third generation cellular networks), etc.

In one embodiment, the network 100 may comprise a plurality of endpoint devices 102-104 configured for communication with the core packet network 110 (e.g., an IP based core backbone network supported by a service provider). The endpoint devices 102-104 may communicate with the IP/MPLS core network 110 via an access network 101. Similarly, a plurality of endpoint devices 105-107 are configured for communication with the core packet network 110 via an access network 108. The network elements 109 and 111 may serve as gateway servers or edge routers for the IP/MPLS core network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and one or more of the network elements (NEs) 109 and 111. The access networks 101 and 108 may each comprise a Digital Subscriber Line (DSL) network, a broadband cable access network, a Local Area Network (LAN), a Wireless Access Network (WAN), a $3^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication network 100 may be expanded by including additional endpoint devices, access networks, network elements, 3$^{rd}$ party networks, and the like without altering the scope of the present invention.

The above IP network is described to provide an illustrative environment in which packets for voice, data and multimedia services are transmitted on networks. The current invention discloses a method and apparatus for providing case restoration in networks for text input that may have incorrect capitalization or no capitalization.

As discussed above, many applications such as closed captioning and automatic speech recognition engines produce text that is considered to be of poor quality. One reason is that correct text capitalization is considered to be an important factor in determining the quality of a transcript. Although one can use a case restoration module that employs a combination of rule-based capitalization and n-gram language model generated using a large corpus, such approach lacks contemporary data.

To address this criticality, the present invention discloses a method that automatically and periodically queries (e.g., using a web crawler) a plurality of content sources, e.g., news websites, which are generally maintained regularly. In one embodiment, these content sources are automatically accessed via a plurality of Rich Site Summary (RSS) feeds (broadly defined as information feeds) to download recent news stories. The textual information from these recent news stories can be extracted and used to train new n-gram models that, in turn, can be used to update an existing case restoration module. In other words, the present method utilizes widely available up-to-date documents (e.g., web-based documents) to increase the accuracy of a case restoration module, which when applied in closed captioning application and automatic speech recognition application, will improve the experience of a user by providing textual information that is properly capitalized.

Figure 2:
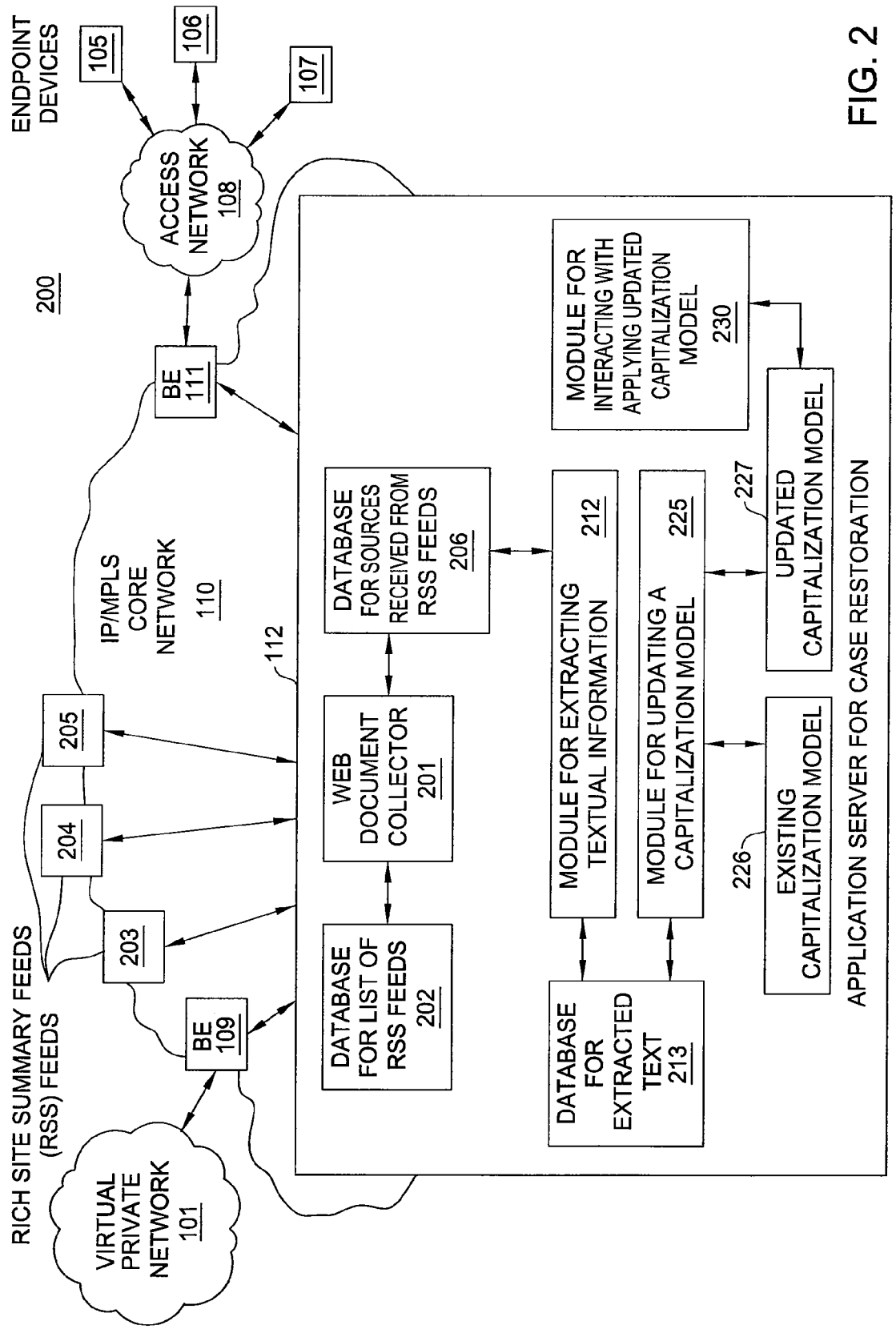
FIG. 2 illustrates an exemplary network with case restoration in accordance with one embodiment of the present invention.

FIG. 2 illustrates an exemplary network 200 with case restoration in accordance with one embodiment of the present invention. For example, an enterprise customer with a Virtual Private Network (VPN) 101 is accessing network services from an IP/MPLS core network 110. The IP/MPLS core network 110 contains the BEs 109 and 111, and an application server for case restoration 112. The VPN 101 is connected to the IP/MPLS core network 110 via a border element 109. User endpoint devices 105-107 access network services from the IP/MPLS core network 110 via access network 108. The user endpoint devices 105-107 interact with IP/MPLS core network 110 via an access network 108 and border element 111. Thus, packets from the enterprise customer transmitted towards user endpoint devices 105-107 may traverse VPN 101, the IP/MPLS core network from border element 109 to border element 111, and access network 108.

In one embodiment, the IP/MPLS core network 110 also contains Rich Site Summary (RSS) feeds 203-205. An RSS feed refers to XML files that are maintained by website owners and administrators for the purpose of sharing new content. For example, a list of RSS feeds may be a list of websites of news networks, magazine publisher websites, etc. For example, the list may comprise yahoo.com of Sunnyvale, Calif., newsnetwork1.com, magazine1.com, magazine2.com, etc.

In one embodiment, the service provider implements the current invention for case restoration in an application server 112. For example, the application server for case restoration 112 contains: a web document collector 201, a database for containing a list of selected Rich Site Summary (RSS) feeds 202, a database 206 for storing sources collected from one or more RSS feeds, a module for extracting textual information 212, a database for storing extracted text 213, a module for updating a capitalization model 225, an existing capitalization model 226, an updated capitalization model 227, and a module 230 for interacting with customers and applying the updated capitalization model. It should be noted that although a plurality of separate databases is illustrated in FIG. 2, the present invention is not so limited. Namely, any number of databases can be implemented to store the various information or data as described below.

In one embodiment, the web document collector 201 retrieves the list of RSS feeds from the database 202 and queries each RSS feed. For example, the list may contain RSS feeds 203, 204 and 205. The web document collector 201 then queries the RSS feeds 203, 204, and 205 and downloads various content sources, e.g., news articles, publications, images, news clips, video file, audio file, etc. The web document collector 201 then stores the content sources downloaded from the RSS feeds 203-205 into the database 206. For example, the database 206 may contain articles, news publications, magazine publications, etc. Note that the content sources in database 206 may have textual information along with pictures, commercials, videos, etc. Then, the module for extracting textual information 212 extracts the textual information and stores it in database 213. In one embodiment, the module for updating capitalization model 225 uses the extracted textual information stored in database 213 to update the existing capitalization model 226 and to create the updated capitalization model 227. The method of updating the capitalization model is provided below.

In one embodiment, the module 230 for interacting with customers and applying updated capitalization model receives the text input for case restoration, applies the latest capitalization model on the received text, and provides an output with correct capitalization. For example, the existing capitalization model 226 may not have included a named hurricane, e.g., Hurricane Katrina. However, by applying the updated capitalization model 227, based on the latest extracted text from the RSS feeds, the present method will be able to correctly capitalize the name of the hurricane. It should be noted that although RSS feeds are described in the context of the present invention, the present invention is not so limited. Namely, information feeds in accordance with other standards can be adapted to the present invention.

In one embodiment, the current invention updates the capitalization model by using an n-gram based capitalization algorithm wherein n is an integer greater than zero, e.g., $n=9$, $n=4$, etc. The n-gram refers to a sequence of lower case words stored in a hash table. The n-gram is also sometimes referred to as a token. The values of the n-grams are the target capitalized versions of the n-gram. For example, a hash of "big apple" is "Big Apple."

When the capitalization algorithm runs, it looks for the longest n-gram in the current position in the text that matches it, and then capitalization is applied as it is capitalized in the n-gram. For example, if $n=9$, the capitalization algorithm starts from $n=9$ characters from the current position. If the algorithm does not find a match, then it looks at $n-1$ characters from the current position, e.g., if $n=9$, it looks at 8 characters from the current position. The algorithm continues until only a single word at the current position in the text is examined to see if it exists as being capitalized in the n-gram hash. If the single word does not exist as being capitalized in the n-gram hash, the capitalization algorithm leaves the word without capitalization. The algorithm then moves n words ahead after it has completed the capitalization from the current position.

In one embodiment, the current invention trains the capitalization model based on text extracted from a recent period of time, wherein the period of time is predetermined by the service provider. For example, the service provider may train the capitalization model based on text extracted during the most recent 3 months, 1 week, etc.

In one embodiment, the current method uses words that are not the first word of each sentence for the training of the capitalization model. This is beneficial because the first word of each sentence is always capitalized if the text is in English.

In one embodiment, the current method uses tokens with occurrence above a specific minimum threshold, wherein the minimum threshold is configured by the service provider. For example, the method may ignore tokens with total occurrence less than 3 times for the purpose of avoiding tokens created as a result of typographical errors.

In one embodiment, the current method keeps tokens with frequency above a predetermined significance threshold as one n-gram, wherein the significance threshold is configured by the service provider. Significance threshold is a threshold that indicates a specific type of capitalization is more dominant compared to all other alternatives. For example, a specific capitalization for a token may be associated with 70% of the token frequency. If the service provider sets the significance threshold as 60%, then the above capitalization with 70% is then kept as one n-gram. If the service provider set the significance threshold as 95%, then the above capitalization may not be kept as one n-gram.

For example, the method may first identify each chunk of adjacent capitalized terms and denote the lower case of the chunk as a token. For example, token 1 may be "big apple." The length of a token may then vary from a single term to n terms. The method then scans the entire corpus again to compute the statistics of all possible capitalizations of each token. For example, the statistics of token 1 in one training corpus may be as follows:

Frequency ("big apple")=37;
Frequency ("big apple"=>"big apple")=2; and
Frequency ("big apple"=>"Big Apple")=35.

The n-gram created in the above example is Hash ("big apple")="Big Apple." In one embodiment, the current method removes redundant n-grams. For example, the n-gram list may contain the following three tokens:

Hash ("tom smith")="Tom Smith";
Hash ("tom")="Tom"; and
Hash ("smith")="Smith."

The first n-gram (Tom Smith) is then redundant to the last two n-grams. The method then removes the first n-gram and reduces processing complexity.

In one embodiment, the method then merges the n-grams built from the new training corpus, with the existing n-grams. For example, for each token in the new n-grams, the method either updates the existing n-gram if the token exists or adds a new n-gram if the token is new. The method then removes the redundancy in the merged n-grams. The merged n-grams are then used by the case restoration module for any new content acquired to be processed. For example, the method then receives input text that needs correct capitalization and processes the input text into output text with the correct capitalization.

In one embodiment, the current invention also enables users to manually add n-grams that may not be caught by a training corpus. For example, if a title of a new movie, or an unpopular name may be missed as a misspelling and so on. Manual entry of n-grams into the capitalization model enables correct capitalization of such names, titles, etc.

Figure 3:
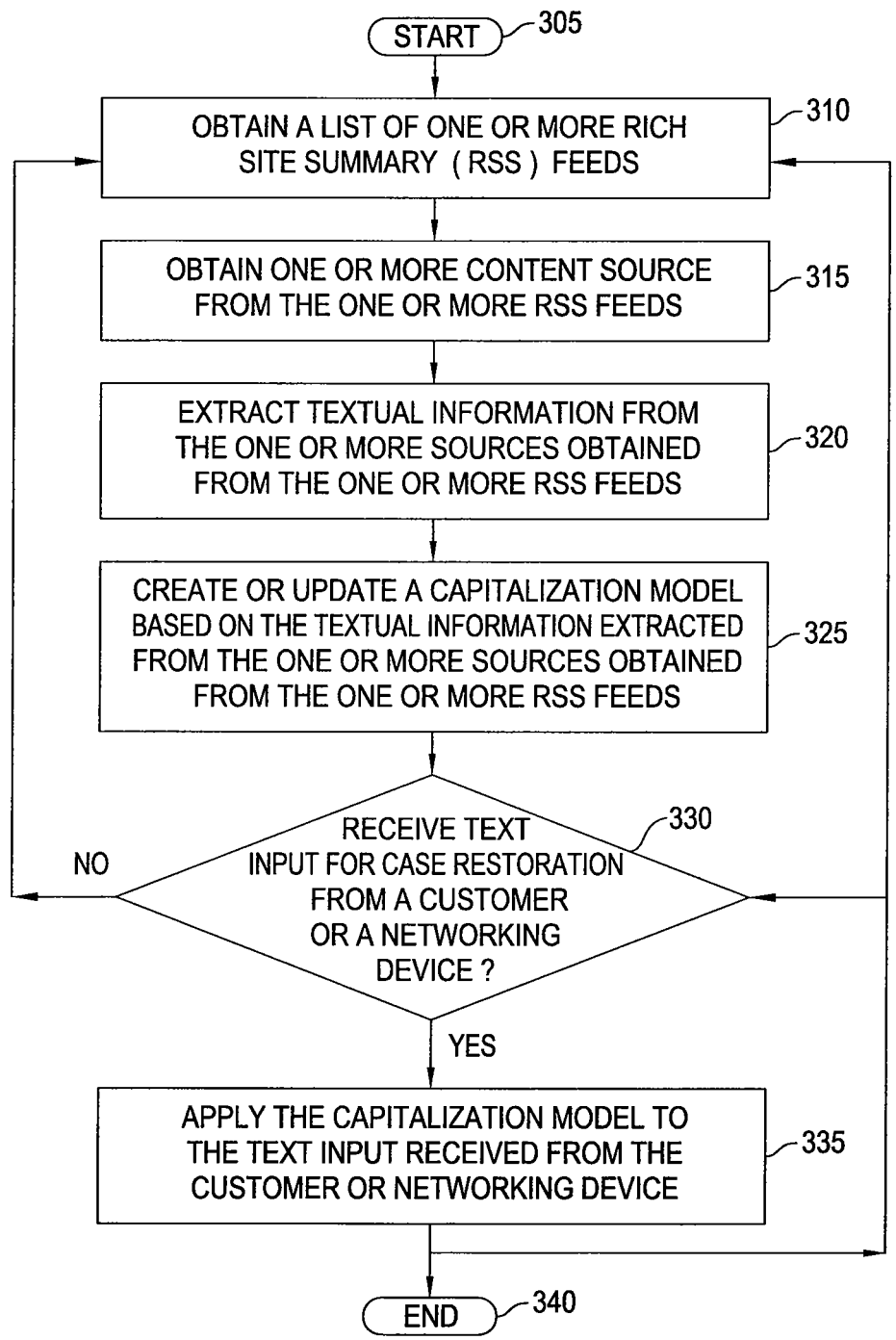
FIG. 3 illustrates a flowchart of a method for providing case restoration in accordance with one embodiment of the present invention.

FIG. 3 illustrates a flowchart of a method 300 for providing case restoration. For example, one or more steps of method 300 can be implemented by an application server. Method 300 starts in step 305 and proceeds to step 310.

In step 310, method 300 obtains a list of one or more Rich Site Summary (RSS) feeds. For example, the service provider may maintain a database of one or more RSS feeds such as websites for news organizations, various publications, etc. The method then retrieves the list of one or more RSS feeds from the database. The method then proceeds to step 315.

In step 315, method 300 obtains one or more content sources from the one or more RSS feeds. For example, the method may query each of the one or more RSS feeds and gathers the latest news, publications, etc.

In one embodiment, the service provider may subscribe to periodic updates from the one or more RSS feeds. For example, the service provider may subscribe to hourly updates of sports news, business news, etc. from various news websites.

In step 320, method 300 extracts textual information from the one or more content sources obtained from the one or more RSS feeds. For example, a content source obtained from an RSS feed may contain textual information along with one or more pictures, videos, etc. The method then extracts the textual information only. The method then proceeds to step 325.

In step 325, method 300 creates or updates a capitalization model based on the textual information extracted from the one or more content sources obtained from the one or more RSS feeds. For example, if there is no existing capitalization model, then the method may create n-grams based on the newly extracted textual information. If there is an existing capitalization model, then the method creates n-grams based on newly extracted text, merges the new n-grams with existing n-grams, and/or removes redundant n-grams. The method then proceeds to step 330.

In step 330, method 300 determines whether text input for case restoration from a customer or a networking device is received. For example, a customer or a networking device, e.g., a server, a computer, etc. may provide text input for the purpose of having the capitalization restored. For example, a networking device that provides closed captions for TV programming may send text that is written in all capital letters and may request case restoration to be performed on the text input such that a correctly capitalized version of the text input is sent back to the customer or networking device. If text input is received for case restoration, then the method proceeds to step 335. Otherwise, the method proceeds back to step 310.

In step 335, method 300 applies the capitalization model to the text input received from the customer or networking device. For example, the method applies the latest capitalization model on the received text input and provides a correctly capitalized text as an output. The method ends in step 340. Alternatively, the method may proceed to step 310 to continue receiving RSS feeds or to step 330 to continue receiving text input for case restoration.

Those skilled in the art would realize that the current invention for providing case restoration may be implemented at a customer location, at an access provider's location, or the network service provider's location. For example, the application server 112 of FIG. 2 may be located at the enterprise customer's site.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
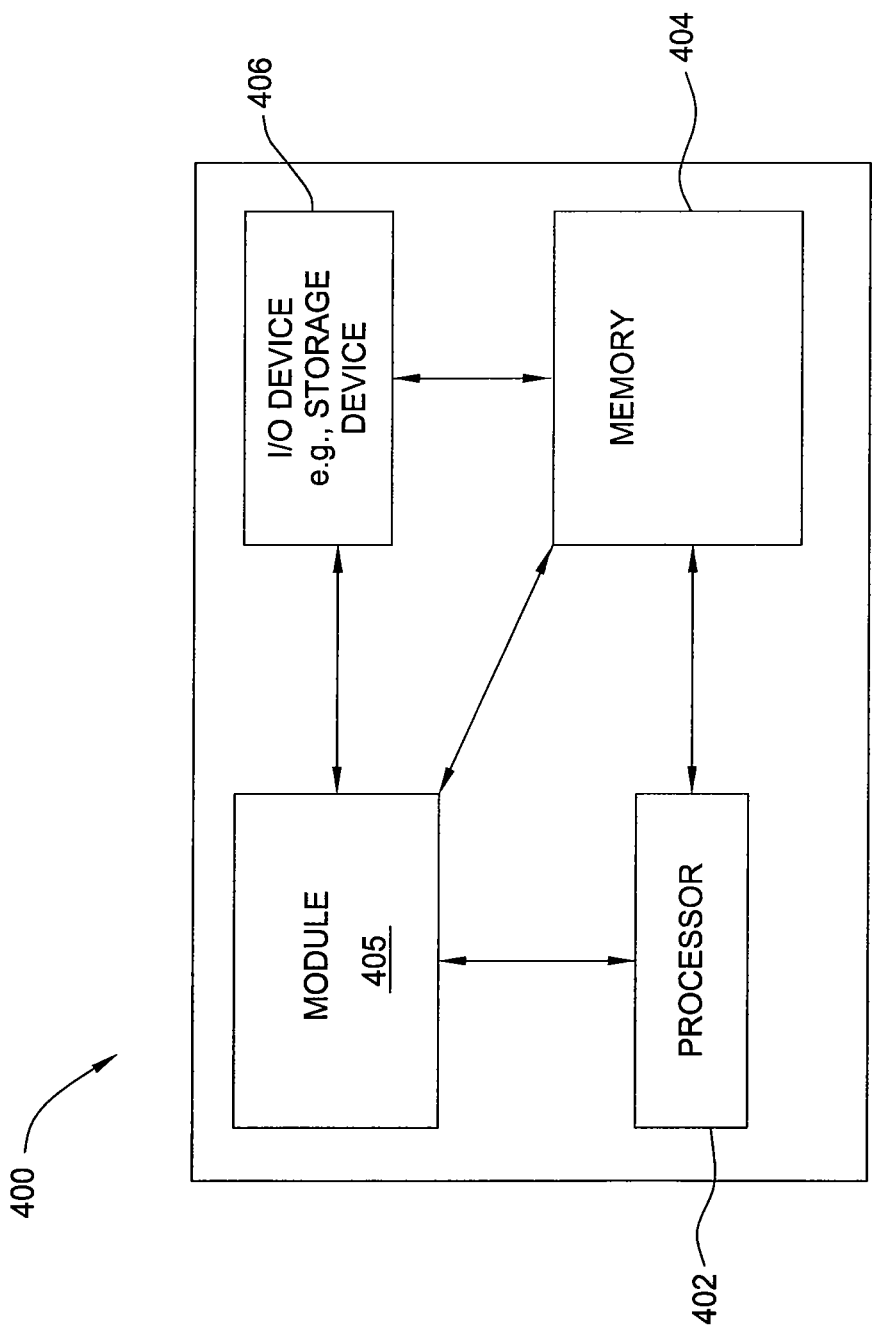
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing case restoration, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing case restoration can be loaded into memory 404 and executed by processor 402 to implement the functions as discussed above. As such, the present method 405 for providing case restoration (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for updating a capitalization model, comprising:
    obtaining, by a processor, a content source from an information feed from a website of a news source within a first period of time predetermined by a service provider;
    extracting, by the processor, textual information from the content source obtained from the information feed; and
    updating, by the processor, the capitalization model based on the textual information, wherein the textual information is from a second period of time predetermined by the service provider, wherein the capitalization model that is updated is applied to a text input using an n-gram based capitalization method, wherein n is an integer greater than zero, wherein the n-gram based capitalization method looks for a match beginning with a longest n-gram of a character length n and if no match is found, repeating the updating for each subsequent n-gram having the character length from n−1 to n=1 until the match is found, wherein the updating the capitalization model removes a redundant n-gram, wherein the redundant n-gram comprises a merged n-gram having multiple tokens, wherein one of the multiple tokens is same as a single token of a different n-gram and a new n-gram is added for one of the multiple tokens in the merged n-gram that is new.

2. The method of claim 1, wherein the information feed comprises a rich site summary feed.

3. The method of claim 1, wherein the text input is received from a networking device.

4. The method of claim 1, wherein the first period of time is based on a periodic basis.

5. The method of claim 4, wherein the obtaining the content source from the information feed is performed by a web crawler.

6. The method of claim 1, wherein the news source comprises a news organization.

7. The method of claim 6, wherein the content source comprises a news story.

8. The method of claim 1, wherein the updating the capitalization model uses words that are not a first word of a sentence.

9. The method of claim 1, wherein the updating the capitalization model uses n-grams with occurrence above a specific minimum threshold.

10. The method of claim 1, wherein the updating the capitalization model keeps n-grams with a frequency above a predetermined significance threshold as one n-gram.

11. The method of claim 1, wherein the updating the capitalization model enables a n-gram to be added to the capitalization model.

12. The method of claim 1, wherein a service provider subscribes to a periodic update from the information feed for obtaining the content source.

13. The method of claim 1, wherein the capitalization model is applied to a closed captioning application.

14. The method of claim 1, wherein the capitalization model is applied to an automatic speech recognition application.

15. A non-transitory computer-readable medium storing a plurality of instructions which, when executed by a processor, cause the processor to perform operations for updating a capitalization model, the operations comprising:
    obtaining a content source from an information feed from a website of a news source within a first period of time predetermined by a service provider;
    extracting textual information from the content source obtained from the information feed; and
    updating the capitalization model based on the textual information, wherein the textual information is from a second period of time predetermined by the service provider, wherein the capitalization model that is updated is applied to a text input uses an n-gram based capitalization method, wherein n is an integer greater than zero, wherein the n-gram based capitalization method looks for a match beginning with a longest n-gram of a character length n and if no match is found, repeating the updating for each subsequent n-gram having the character length from n−1 to n=1 until the match is found, wherein the updating the capitalization model removes a redundant n-gram, wherein the redundant n-gram comprises a merged n-gram having multiple tokens, wherein one of the multiple tokens is same as a single token of a different n-gram and a new n-gram is added for one of the multiple tokens in the merged n-gram that is new.

16. The non-transitory computer-readable medium of claim 15, wherein the information feed comprises a rich site summary feed.

17. The non-transitory computer-readable medium of claim 15, wherein the text input is received from a networking device.

18. The non-transitory computer-readable medium of claim 15, wherein the first period of time is based on a periodic basis.

19. An apparatus for updating a capitalization model, comprising:

a processor; and a computer-readable medium storing a plurality of instructions which, when executed by the processor, cause the processor to perform operations, the operations comprising:

obtaining a content source from an information feed from a website of a news source within a first period of time predetermined by a service provider;

extracting textual information from the content source obtained from the information feed; and updating the capitalization model based on the textual information, wherein the textual information is from a second period of time predetermined by the service provider, wherein the capitalization model that is updated is applied to a text input using an n-gram based capitalization method, wherein n is an integer greater than zero, wherein the n-gram based capitalization method looks for a match beginning with a longest n-gram of a character length n and if no match is found, repeating the updating for each subsequent n-gram having the character length from n−1 to n=1 until the match is found, wherein the updating the capitalization model removes a redundant n-gram, wherein the redundant n-gram comprises a merged n-gram having multiple tokens, wherein one of the multiple tokens is same as a single token of a different n-gram and a new n-gram is added for one of the multiple tokens in the merged n-gram that is new.

* * * * *